United States Patent [19]

Thompson

[11] 4,278,743
[45] Jul. 14, 1981

[54] GENERATION OF ELECTRICAL ENERGY

[76] Inventor: Jack E. Thompson, "Edgmont", Woodhouse La., Holmbury St. Mary, Nr. Dorking, Surrey, England

[21] Appl. No.: 108,555

[22] Filed: Dec. 31, 1979

[51] Int. Cl.³ .............................................. H01M 6/34
[52] U.S. Cl. ..................................... 429/119; 429/149
[58] Field of Search ............... 429/119, 47, 149, 156, 429/160, 120, 158

[56] References Cited

U.S. PATENT DOCUMENTS

| 495,582 | 4/1893 | Emme | 429/47 |
|---|---|---|---|
| 728,381 | 5/1903 | Emme | 429/47 |
| 2,669,596 | 2/1954 | Nelson | 429/119 X |
| 2,684,988 | 7/1954 | Wilburn | 429/119 |
| 2,856,616 | 10/1958 | Dodge | 429/156 |
| 3,462,309 | 8/1969 | Wilson | 429/119 |
| 4,198,474 | 4/1980 | Shah | 429/119 |

FOREIGN PATENT DOCUMENTS 442137 6/1912 France ..................... 429/119

Primary Examiner—Anthony Skapars
Attorney, Agent, or Firm—Roylance, Abrams, Berdo & Farley

[57] ABSTRACT

A marine installation for generating electrical energy, which installation operates as a giant battery using the sea as the electrolyte and comprises a plurality of electrodes (6, 8) connected together mechanically and electrically to form a floating structure of cells (5) which is anchored to the sea bed and insulated to prevent loss of potential by conduction.

8 Claims, 6 Drawing Figures

GENERATION OF ELECTRICAL ENERGY

This invention relates to the generation of electrical energy and its object is to provide generating means which requires neither moving parts nor conventional fuels and is relatively inexpensive to run.

The invention utilises the capability of sea water to react electrochemically with various materials and accordingly provides a marine installation which operates as a giant battery with the sea as the electrolyte and a plurality of electrodes connected together mechanically and electrically in the form of a floating cell structure which is anchored to the sea bed and suitably insulated to prevent loss of potential by conduction.

One embodiment of the invention will be described, by way of example, with reference to the accompanying drawing in which.

Figure 1:
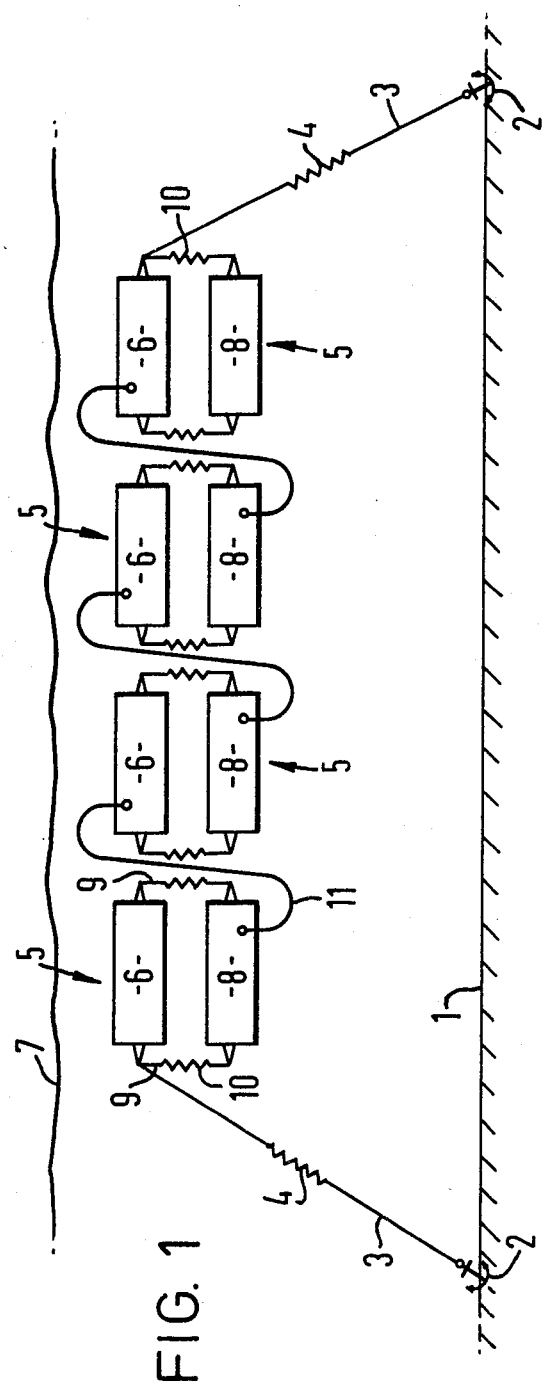
FIG. 1 shows, in elevation, a row of electric cells forming part of a floating battery anchored to the sea bed.

As shown in FIG. 1, the floating cell structure of the battery is secured to the sea bed 1 by anchors 2 at the desired location with the anchor warps 3 stretched out in all directions around the cell structure and incorporating insulators 4 of a size capable of preventing loss of potential by conduction along the warps.

Each cell 5 of the battery comprises an upper electrode unit 6 arranged to float on or just below the surface 7 of the water and a lower, somewhat heavier, electrode unit 8 suspended from the upper unit by supports 9 incorporating insulators 10. The upper units 6 are preferably arranged at the same level and are pivotally connected together by means (not shown) incorporating insulators to enable these units to move relatively to one another in response to the motion of the sea. The individual cells 5 of the battery are electrically connected in series by means of cables 11 each of which connects the lower electrode unit 8 of one cell to the upper electrode unit 7 of the next cell.

Each individual cell 5 may have an E.M.F. of about 2 volts and occupy an area of about 40 square yards, so that a 100 volt battery generating power of the order of 5 megawatts and made up of fifty cells arranged in ten rows containing five cells in each row would occupy a total area of about 2000 square yards, for instance, a rectangular area measuring approximately 100 yards by 20 yards.

Figure 2:
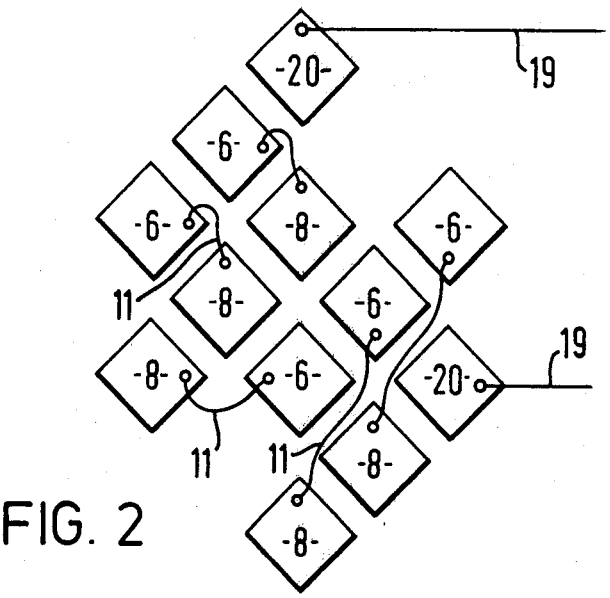
FIG. 2 shows, in perspective, two rows of electric cells and the external power take-off connections.

The potential difference between adjacent cells 5 is low and leakage is consequently small. In addition, the cells 20 between which a relatively high potential difference exists and from which power is taken off through cables 19 (FIG. 2), are so far apart that leakage is minimal.

Figure 4:
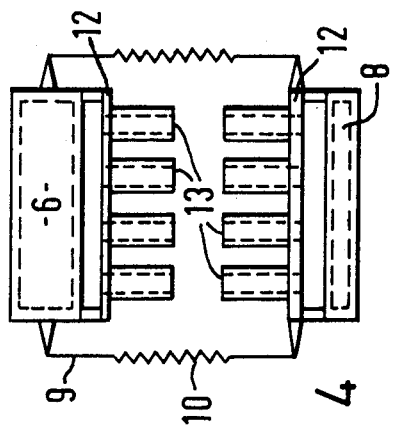
FIGS. 3 and 4 show, in elevation, electric cells having different forms of electrodes.
Figure 3:
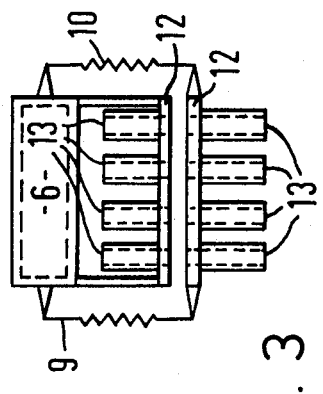
Figure 5:
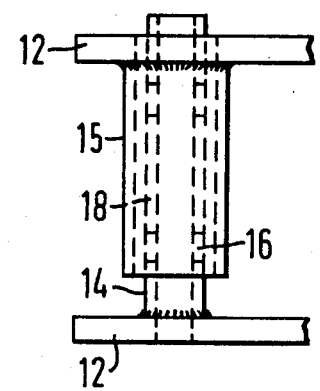
FIGS. 5 and 6 show, in elevation and horizontal section respectively, parts of two interengaging electrodes of an electric cell.
Figure 6:
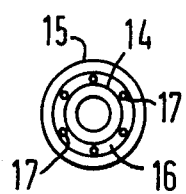

Each electrode unit 6, 8 includes an electrode which is made of or coated with a material which reacts electrochemically with sea water and preferably takes the form of a plate 12, the surface area of which is increased by the provision of tubes 13 welded at one end in apertures in the plate. The plates 12 of each cell may be mounted with their tubes 13 extending away from or towards each other as shown in FIGS. 3 and 4 respectively and in the latter case it may be expedient, as shown in FIG. 5, for opposing tubes 14 and 15 to slide one within the other with the interposition of concentric spacing rings 16 of insulating material which are axially bored at 17 for the passage of the electrolyte. In this case, the gap 18 between the concentric walls of the opposing tubes 14, 15 is extremely short and a flow of cooling medium may be passed in an axial direction through the innermost 14 of each concentric pair of tubes.

Any heat generated will normally be dissipated due to displacement of the heated water by convection and by normal tidal movement. In the long term however, any overall increase in the warmth of the water could be used, with advantage, to aid fish farming.

At the maximum voltage generated, the direct current can be converted to alternating current using a standard rotary or static converter and since the whole battery floats the converter can be mounted on one of the upper units 6 or, if this is submerged, on a platform or tower mounted thereon.

Alternatively, the D.C. cable could be run ashore for connection to a shore-based converter. In the latter case, the whole installation could be completely submerged and consequently not subject to air erosion, wave action or other extraneous forces other than tidal flow which is well taken care of by the anchor warps 3.

The invention accordingly provides a trouble-free means of generating electricity which is particularly applicable to the supply of power to remote islands where the installation could be anchored in sheltered waters subject only to the rise and fall of the tide and to swells or choppy surface action which would have little effect on an installation of this size.

I claim:

1. A marine installation for generating electrical energy, which installation operates as an electric battery using the sea as the electrolyte and comprising a plurality of individual electric cells connected together mechanically and electrically to form a floating structure which is anchored to the sea bed and insulated to prevent loss of potential by conduction, each cell comprising an upper electrode coated with a material which reacts electrochemically with sea water and arranged to float on or just below the surface of the water, a lower electrode of greater weight than said upper electrode and also coated with a material which reacts electrochemically with sea water, insulated means and insulated means suspending said lower electrode from said upper electrode.

2. An installation according to claim 1, wherein said upper electrodes of individual cells are pivotally connected together in a horizontal plane for movement relative to one another in response to the motion of the sea.

3. An installation according to claim 1 or 2, wherein said cells are electrically connected in series by flexible cables extending between the lower electrode of one cell and the upper electrode of the next cell.

4. An installation according to claim 1, wherein each electrode is in the form of a plate having tubes extending outwardly at right angles to the surface thereof.

5. An installation according to claim 4, wherein the tubes on one electrode of a cell extend towards or away from the tubes on the other electrode of said cell.

6. An installation according to claim 4, wherein the tubes on one electrode of a cell are concentric with and are slidable in the tubes on the other electrode of said cell.

7. An installation according to claim 6, wherein said concentric tubes are radially spaced from each other by concentric rings which are axially bored for the passage of electrolyte along the tubes.

8. An installation according to claim 6 or 7, wherein the inner of said concentric tubes is open for the axial flow of cooling medium therethrough.

* * * * *